United States Patent [19]

Abrahams

[11] Patent Number: 4,803,391
[45] Date of Patent: Feb. 7, 1989

[54] UNIPOLAR MOTOR AND MECHANICAL CONVERSION SYSTEM AND METHOD

[75] Inventor: Sidney Abrahams, Miami, Fla.

[73] Assignee: Genedyne Corp., Miami, Fla.

[21] Appl. No.: 39,382

[22] Filed: Apr. 17, 1987

[51] Int. Cl.$^4$ .................. H02K 31/04; H02K 13/00
[52] U.S. Cl. ..................................... 310/178; 310/219
[58] Field of Search .................. 310/178, 156, 219

[56] References Cited

U.S. PATENT DOCUMENTS

| 742,600 | 10/1903 | Cox, Jr. | 310/178 |
| 1,987,479 | 1/1935 | Japolsky | 310/178 X |

Primary Examiner—Patrick R. Salce
Assistant Examiner—D. L. Rebsch
Attorney, Agent, or Firm—John Cyril Malloy

[57] ABSTRACT

The electro-mechanical converter, that can be considered a unipolar motor, includes a rotatable rotor made of conductive but low permeability material having two axially spaced, radially protruding integral disks. The first disk is larger than the second disk, and two toroid magnets are disposed on either axial side of the first disk. The two magnets have opposing poles facing each other. The two magnets establish a circumferential, unidirectional magnetic field through the first disk over a radial mid-section of the disk. D.C. current is introduced at the edge of the disk, at a fixed location relative to the rotatable rotor via a mercury bath. The D.C. current is removed from the rotor assembly via the second disk and a second mercury bath.

12 Claims, 1 Drawing Sheet

UNIPOLAR MOTOR AND MECHANICAL CONVERSION SYSTEM AND METHOD

BACKGROUND OF THE INVENTION

The present invention relates to a unipolar motor, an electro-mechanical converter for converting electrical energy into mechanical energy, and a method of converting such electrical energy.

Typically, motors include a plurality of poles disposed at circumferential locations about the axis of rotation of the rotor of the motor. The present invention is unipolar since a unidirectional magnetic field is utilized.

SUMMARY OF THE INVENTION

In one embodiment, the electro-mechanical converter, that can be considered a unipolar motor, includes a rotatable rotor made of conductive but low permeability material having two axially spaced, integral disks. The first disk is larger than the second disk. Two toroid shaped magnets are disposed on either axial side of the first disk and opposing pole faces of each magnet face each other. The two magnets establish a circumferential, unidirectional magnetic field through the first disk over a substantially uniform radial mid-section of the disk. Current is introduced at the edge of the disk at a fixed location relative to the rotatable rotor via a mercury bath. The D.C. current is removed from the rotor assembly via the second disk and a second mercury bath.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to an electro-mechanical converter for generating mechanical energy from a D.C. power source, a unipolar motor, and a method for converting the direct current (D.C.) power into mechanical power.

Figure 1:
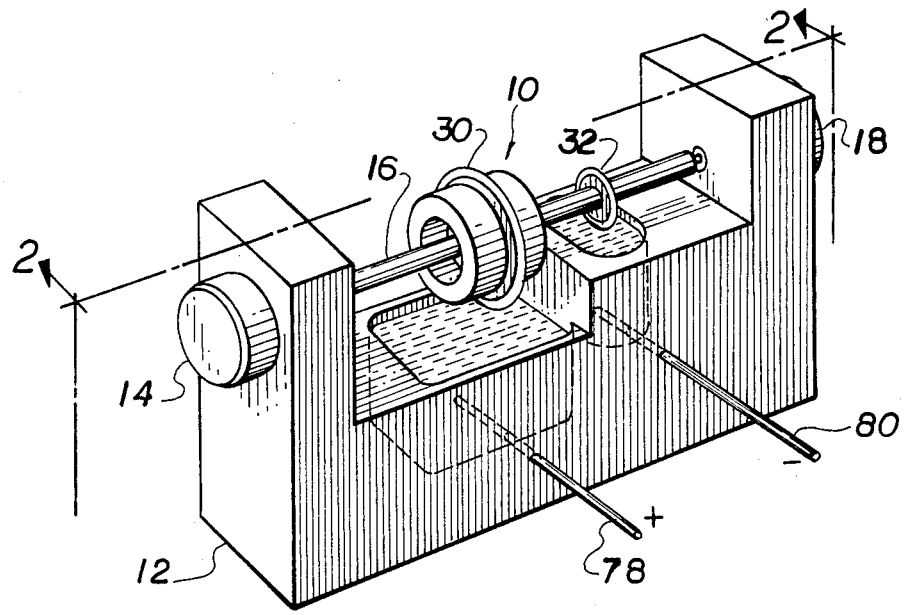
FIG. 1 illustrates a perspective view of the unipolar motor (electro-mechanical converter)
Figure 2:
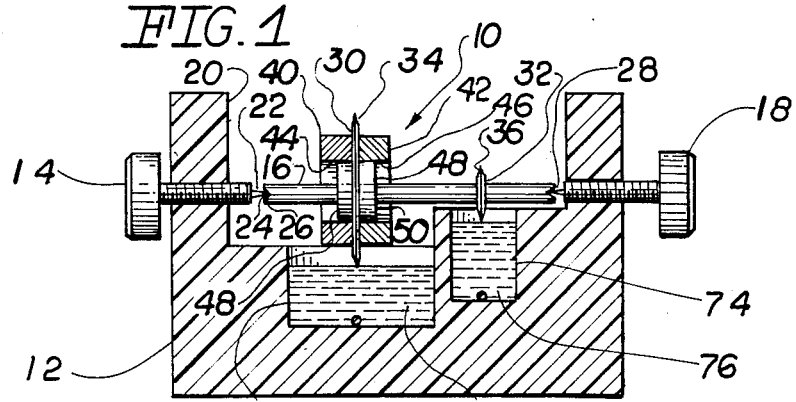
FIG. 2 illustrates a sectional view of the motor from the perspective of section lines 2'—2" in FIG. 1; and, FIG. 3 illustrates an exploded view of the motor assembly generally as a side view thereof.
Figure 3:
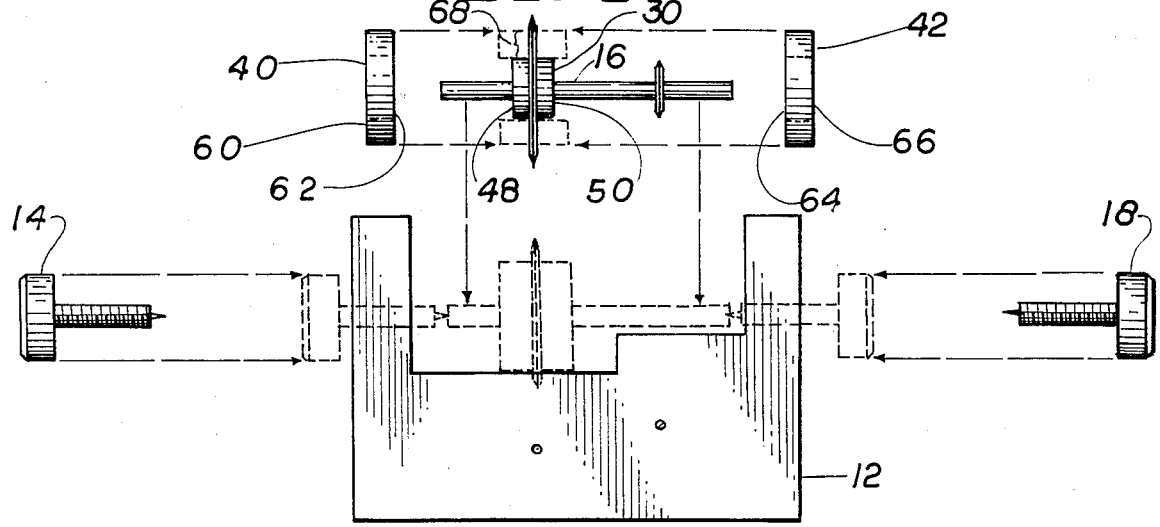

FIG. 1 illustrates a perspective view of motor assembly 10. FIG. 2 illustrates a cross-sectional view and FIG. 3 an exploded view. All the figures will be referred to simultaneously wherein like numerals designate similar items. Assembly 10 includes base 12 and a bearing means 14, at one axial end of rotor 16, and a bearing means 18 at the other axial end of the rotor. As best shown in FIG. 2, bearing means 14 includes a threadable rod 20 and a needle bearing 22 that acts on depression 24 at end 26 of rotor 16. Bearing means 18 includes a similar bearing structure at end 28 of the rotor. As shown in FIG. 3, bearing means 14 and 18 are threaded into base 12 and the axial force applied to the rotor is based upon the degree of insertion of bearing means 14 and 18.

The rotor is made of an electrically conductive material that has a low relative permeability. For example, in one embodiment, aluminum is utilized as the material for the rotor. Generally, aluminum has a conductivity of $3.82 \times 10^7$ mhos/m and has a relative permeability of 1.0. Aluminum is classified as a diamagnetic material as compared with ferromagnetic materials that have significantly higher degrees of relative permeability such as ferrite, (relative permeability of 1,000), pure iron (relative permeability of 4,000), and mumetal (relative permeability 20,000). However, the conductivity of iron is $1.03 \times 10^7$ mhos/m, that is generally similar to that of aluminum.

Integral with rotor 16, and made of the same material, is a pair of disks 30 and 32. Disk 30 is larger than disk 32. The disks radially protrude from rotor 16. Along their periphery, both disks are pointed, by way of bevels 34 and 36 respectively on disks 30 and 32. As shown, the disks are axially spaced along rotor 16.

At either axial end of disk 30 is a toroid magnet. These are magnets 40 and 42. Bores 44 and 46, respectively of magnets 40 and 42, are positioned by axially extending shoulders 48 and 50 protruding from disk 30. Shoulders 48 and 50 are an integral part of rotor 16. This is best shown in FIG. 3.

Magnets 40 and 42 have pole faces and are disposed such that opposing pole faces each other. For example, magnet 40 has north pole face 60 and south pole face 62 whereas magnet 42 has north pole face 64 and south pole face 66 as shown in FIG. 3. South pole face 62 of magnet 40 faces north pole face 64 of magnet 42 with disk 30 interposed therebetween. The magnets established a circumferential, unidirectional magnetic field through disk 30 over a substantially uniform radial mid-section of the disk. This radial mid-section is identified as radial mid-section 68 in FIG. 3.

In order to convert direct current (D.C.) electrical energy into mechanical energy, a direct current must be introduced (or withdrawn if the power is reversed) into rotor 16 at a fixed location relative to the rotatable disk. To accomplish this introduction at a fixed location, base 12 includes well 70 that retains a conductive liquid material 72. In this embodiment, conductive material 72 is liquid mercury. The periphery of disk 30 intrudes and touches conductive liquid material 72.

To complete the electrical circuit, base 12 includes a second pool 74 that holds liquid conductive material 76. Conductor material 76 is also liquid mercury in a present embodiment. In this embodiment, lead wire 78, shown in FIG. 1, introduces D.C. current into conductive material 72 and lead wire 80 withdraws the current from the assembly via conductive material 76.

In operation, magnets 40 and 42 establish an extremely strong unidirectional magnetic field through disk 30. Since current is introduced at a fixed location at the periphery of the disk, the current flows normal to the unidirectional field. The current flows in a substantially non-varying direction normal to the axis of rotation of rotor 16 through a prescribed and limited region of the circumferential radial mid-section 68. The current then flows axially along rotor 16 and radially outward via disk 32 in conductive material 76. Rotor 16 moves due to the flow of current in a direction normal to the unidirectional magnetic field that extends through the disk.

Due to the low coefficient of friction on the edges of the disk, there are very few losses both electrical and mechanical. It has been calculated that the resistance of this system is about 4 to 8 milliohms. Magnets 40 and 42 are sumarium cobalt permanent magnets. Since the resistance is low, the electrical losses in this conversion system are minimum. Since the magnets are symmetrically located with respect to the axis of rotation of the rotor, the magnetic field does not rotate. Experiments have shown that the material of disk 30 seems to oxidize during extensive operation of this conversion system.

The claims appended hereto are meant to cover modifications and changes within the scope and spirit of the present invention. For example, any mechanism can be provided for establishing a unidirectional magnetic field through disk 30. The bore 46 of disk 42 is larger than the diameter of disk 32 which enables magnetic 42 to be assembled onto rotor 16 as shown in FIG. 3. Other mechanisms could be provided for introducing the current at a fixed location at the periphery of disk 30 other than the pools of conductive liquid material in wells 70 and 74. For example, brushes or other low frictional devices could be used. The term "fixed location" refers to a location which does not rotate with shaft 16 but is at a fixed position notwithstanding the rotation of the rotor. These and other modifications and changes are meant to be encompassed by the appended claims.

What I claim is:

1. An electro-mechanical converter for generating mechanical power from a D.C. power source comprising:
    a rotatable rotor made of conductive but low permeable material;
    at least one disk having a center and a periphery integral with and made of similar material as said rotor;
    means for establishing a unidirectional and uniform magnetic field through a circumferential zone of said one disk between the center and said periphery over a substantially radial mid-section thereof;
    means for introducing current from said D.C. power source at a fixed location relative to said rotatable rotor and at the periphery of said one disk;
    circuit completing means connecting the center of the disk and the periphery of the disk in series and exteriorly of the disk, for current flow through the converter; and
    said means for establishing said field comprising magnet means on one side of said disk.

2. An electro-mechanical converter as claimed in claim 1 including a base and a bearing means for rotatably supporting said rotor on said base.

3. An electro-mechanical converter as claimed in claim 1 including a second disk integral with but made of similar material as said rotor and axially spaced from said one disk, said circuit completing means removing current from said second disk.

4. An electro-mechanical converter as claimed in claim 3 including a base and a bearing means for rotatably supporting said rotor on said base.

5. An electro-mechanical converter as claimed in claim 4 wherein said base includes first and second wells respectively radially below said one and second disks, said means for introducing current including a first pool of conductive material disposed in said first well and in contact with said one disk, and a second pool of conductive material disposed in said second well and in contact with said second disk.

6. An electro-mechanical converter as claimed in claim 1 wherein said means for establishing said unidirectional magnetic field includes two toroid shaped magnets disposed on either axial side of said one disk and having opposing poles thereof facing each other.

7. An electro-mechanical converter as claimed in claim 6 wherein said first and second pools are liquid mercury.

8. An electro-mechanical converter as claimed in claim 6 wherein the axial extent of said first pool of conductive material is larger than the axial extent of both said toroid shaped magnets and the interposed one disk.

9. An electro-mechanical converter as claimed in claim 8 wherein the depth of said first pool of conductive material is less than the depth of said second pool.

10. An electro-mechanical converter as claimed in claim 9 wherein the width of said first and second pools is substantially equal.

11. An electro-mechanical converter as claimed in claim 10 wherein the rotor includes a pair of integral disk positioners axially protruding as shoulders from said one disk and adapted to position the bore of said two toroid shaped magnets.

12. A method of converting D.C. electrical energy into mechanical energy comprising the steps of:
    establishing a unidirectional and uniform magnetic field through a conductive, magnetically low permeable, rotatable disk having a central zone and a periphery;
    conducting direct current through said rotatable disk between the center zone and the periphery;
    conducting said direct current axially with respect to said disk; and
    withdrawing said direct current at an axially spaced location away from said disk.

* * * * *